(12) United States Patent
Edgren et al.

(10) Patent No.: US 8,382,593 B2
(45) Date of Patent: Feb. 26, 2013

(54) METHOD AND SYSTEM FOR CUSTOMIZING ELECTRONIC GAMING MACHINES

(75) Inventors: Joakim Edgren, Gothenburg (SE); Mikael Johansson, Gothenburg (SE); Peter Kaufeldt, Gothenburg (SE)

(73) Assignee: Cork Group Trading Ltd., Road Town, Tortola (VG)

( * ) Notice: Subject to any disclaimer, the term of this patent is extended or adjusted under 35 U.S.C. 154(b) by 1438 days.

(21) Appl. No.: 11/336,570

(22) Filed: Jan. 20, 2006

(65) Prior Publication Data

US 2007/0173328 A1   Jul. 26, 2007

(51) Int. Cl.
 *A63F 13/00* (2006.01)
(52) U.S. Cl. ............................ 463/43; 463/29
(58) Field of Classification Search ............ 463/25, 463/29, 43
See application file for complete search history.

(56) References Cited

U.S. PATENT DOCUMENTS

| | | | |
|---|---|---|---|
| 5,875,327 A * | 2/1999 | Brandt et al. ..................... 713/1 |
| 6,149,522 A * | 11/2000 | Alcorn et al. .................... 463/29 |
| 6,450,885 B2 * | 9/2002 | Schneier et al. ................. 463/29 |
| 6,565,443 B1 * | 5/2003 | Johnson et al. ................. 463/43 |
| 6,645,077 B2 | 11/2003 | Rowe |
| 6,676,516 B2 * | 1/2004 | Baerlocher et al. ............ 463/25 |
| 6,802,778 B1 * | 10/2004 | Lemay et al. .................... 463/42 |
| 6,805,634 B1 * | 10/2004 | Wells et al. ....................... 463/42 |
| 6,886,017 B1 * | 4/2005 | Jackson et al. ......................... 1/1 |
| 2002/0151366 A1 * | 10/2002 | Walker et al. ................... 463/42 |
| 2003/0125100 A1 * | 7/2003 | Cannon ............................ 463/16 |
| 2004/0162129 A1 * | 8/2004 | Nelson ............................. 463/16 |
| 2004/0166940 A1 * | 8/2004 | Rothschild ...................... 463/42 |
| 2004/0198496 A1 * | 10/2004 | Gatto et al. ..................... 463/42 |
| 2007/0093297 A1 | 4/2007 | Moshal |
| 2007/0167235 A1 | 7/2007 | Naicker |

FOREIGN PATENT DOCUMENTS

| | | |
|---|---|---|
| AU | 2006329657 | 7/2007 |
| EP | 1 004 970 A2 | 5/2000 |
| EP | 1 004 970 A3 | 6/2001 |
| WO | WO 00/67112 | 11/2000 |
| WO | WO 2007/074323 A1 | 7/2007 |

OTHER PUBLICATIONS

U.S. Appl. No. 11/253,089, filed Oct. 17, 2005 and entitled Multi-level wager games with autocomplete.

(Continued)

*Primary Examiner* — Sunit Pandya
*Assistant Examiner* — Allen Chan
(74) *Attorney, Agent, or Firm* — McDonnell Boehnen Hulbert & Berghoff LLP

(57) ABSTRACT

A method and system for customizing a gaming machine by transferring software files from a download server to a gaming machine. The download server may store software files in three-tier hierarchical structure and execute program logic to determine which software files need to be transmitted to the gaming machine to customize the gaming machine. The method may include (i) determining a download signature for software files that correspond to the gaming machine and that are stored at the download server, (ii) determining a machine signature for software files stored at the gaming machine, (iii) comparing the download signature to the machine signature, and (iv) allowing the gaming machine to carry out gaming functions if the signatures match, or (v) if the signatures do not match, updating the gaming machine with gaming machine software files and, thereafter, allowing the gaming machine to carry out gaming functions.

34 Claims, 6 Drawing Sheets

OTHER PUBLICATIONS

Tom Sheldon's Linktionary, Hash Functions, downloaded from the World Wide Web at http://www.linktionary.com/h/hash_function.html on Jan. 18, 2006.

MD5 & Hashing Utilities, downloaded from the World Wide Web at http://www.digital-detective.co.uk/freetools/md5.asp on Jan. 18, 2006.

What is the MD5 hash?, downloaded from the World Wide Web at http://www.fastsum.com/support/md5-checksum-utility-faq/md5-hash.php on Jan. 18, 2006.

European Search Report for Euopean Patent Application No. EP 07 25 0241, date of report Nov. 14, 2008.

* cited by examiner

METHOD AND SYSTEM FOR CUSTOMIZING ELECTRONIC GAMING MACHINES

FIELD OF INVENTION

The present invention relates to electronic gaming machines, and more particularly to methods and systems for customizing electronic gaming machines.

DESCRIPTION OF RELATED ART

Land-based gaming establishments such as casinos and betting shops generally have one or more freestanding gaming machines that can be used by players in order to play wagering games.

A gaming machine of this type may be configured to offer a single wagering game to a player, or may enable the player to select a game from a menu of two or more games that are available for play.

Further, such a gaming machine may be a standalone machine consisting of a processor, game software, and a random number generator (RNG), all of which are contained within a single housing or cabinet, and which does not require network connectivity in order to operate. Alternatively, the gaming machine may be designed to function in a client/server topology in which the RNG is located in a remote gaming server that generates game results and delivers the results to the gaming machine. A processor in this alternative type of gaming machine may execute game software to display a simulation of the game results to the player in an intelligible manner. This alternative type of gaming machine requires network connectivity so as to communicate with the gaming server.

Land-based gaming establishments can have any number of gaming machines ranging from one or two machines in a small betting shop, to several hundred gaming machines in a large land-based casino or river boat casino. From time to time, the proprietors of these gaming establishments desire to be able to alter the configuration of the gaming machines in accordance with changing commercial requirements.

Traditionally, gaming machines are supplied to a gaming establishment already configured with game software and input/output peripherals such as buttons, note acceptors (bill validators), coin hoppers, tower lights, and key switches, in accordance with the proprietor's requirements. The gaming machines are also configured with artwork and trademarks in accordance with the gaming establishment. In most instances, the proprietor is unable to change the way the gaming machines are configured without the assistance of the suppliers of the gaming machines.

In order to overcome this limitation, server-based gaming systems are known in which the freestanding gaming machines in a gaming establishment communicate with a download server by means of a local area network. The download server maintains a copy of game software that can be downloaded to one or more of the gaming machines by means of the local area network. In this manner, it is possible for the download server to alter the game software that is run on any gaming machine, thereby presenting a player at that machine with a different game to play. Usually, such an operation is performed in response to business requirements such as reducing the number of machines offering a game that has been shown not be popular with players, and reconfiguring those machines to play different, hopefully more popular games.

A limitation of such server-based gaming systems is that, although the game software can be changed as described, other customization options are not possible, such as changing the input/output peripherals on the machines or changing minimum bet size. It is not possible to modify each individual gaming machine to be in full compliance with the proprietor's requirements.

SUMMARY

As explained above, it is not possible to modify individual gaming machines to be in full compliance with a proprietor's requirements. To overcome this problem, exemplary embodiments of methods and systems for customizing a gaming machine to be in full compliance with a proprietor's requirements are described herein.

In one respect, an exemplary embodiment may take the form of a download server for customizing a gaming machine. The download server includes a computer-readable medium having program instructions stored thereon. Execution of the program instructions carries out arranging software files into a hierarchical file structure within the computer-readable medium. The hierarchical file structure includes: (i) a first tier corresponding to a default configuration, (ii) a second tier corresponding a group-level configuration, and (iii) a third tier corresponding to a machine-level configuration. In accordance with this exemplary embodiment, the group-configuration is higher in priority than the default configuration, and the machine-level configuration is higher in priority than both the default configuration and the group-level configuration.

Another exemplary embodiment may take the form of a method for customizing a gaming machine. In this regard, the method may include: (i) receiving, at a gaming machine, a download signature associated with the gaming machine, (ii) determining a machine signature for the gaming machine, and (iii) determining whether the machine signature matches the download signature. If the determination indicates the machine signature matches the download signature, the gaming server responsively enters a state in which the gaming machine may carry out gaming. However, if the determination indicates the machine signature does not match the download signature, then prior to entering the state, the gaming machine responsively (i) notifies a download server of the mismatch, (ii) receives a software package for updating the gaming machine, and (iii) updates the gaming machine with the software package.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

Since it is not possible to currently modify an individual gaming machine to be in full compliance with a proprietor's requirements, for any given gaming machine that is not in full compliance with the proprietor's requirements, the proprietor's only options for operating the gaming machine may be to allow operation of the game in an undesirable configuration or not to allow the gaming machine to be operated at all, which is a waste of the proprietor's resources. Both of these options are undesirable.

To overcome the situation described above, and other limitations associated with customizing a gaming machine, the methods and systems described herein allow for using a download server to customize a gaming machine to be in full compliance with a proprietor's requirements. Customization of the gaming machine may include downloading (i.e., transferring) gaming machine software files to the gaming machine from the download server. These gaming machine software files may include: (i) files executable by the gaming machine, (ii) non-executable files, and/or (iii) some other type or types of software files. After installation of the files at the gaming machine, the gaming machine may be operated in full compliance with the proprietor's requirements.

An exemplary method for customizing a gaming machine includes: (i) determining a download signature for gaming machine software files that (a) correspond to the gaming machine, and (b) are stored at a download server in a hierarchical configuration, (ii) determining a machine signature for gaming machine software files stored at the gaming machine, (iii) comparing the download signature to the machine signature, and (iv) allowing the gaming machine to carry out gaming functions if the signatures match, or (v) if the signatures do not match, updating the gaming machine with gaming machine software files and, thereafter, allowing the gaming machine to carry out gaming functions. Other exemplary methods, as well as exemplary systems, are described below.

2. Exemplary Architecture

Figure 1:
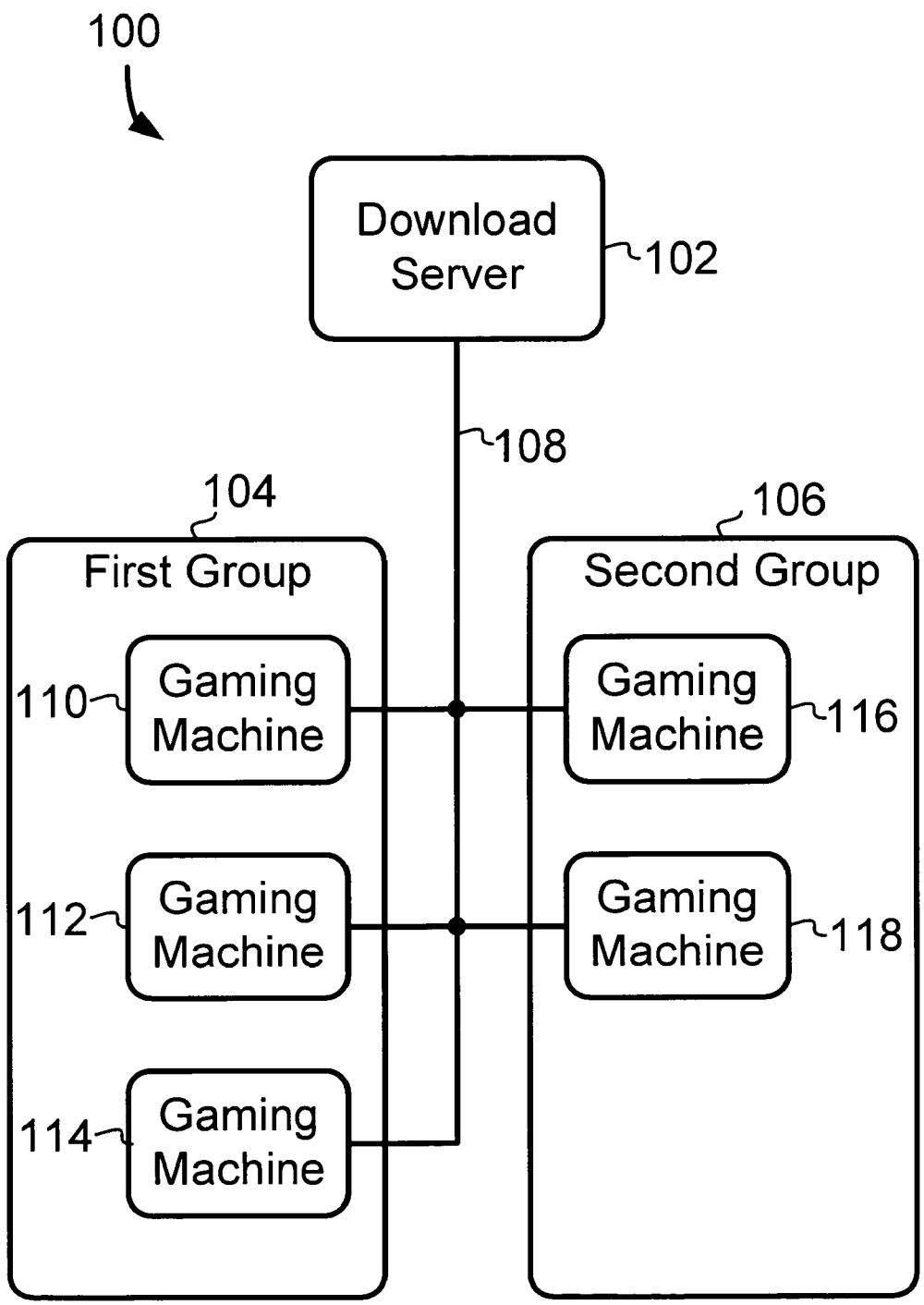
FIG. 1 illustrates a simple block diagram of a system in accordance with an exemplary embodiment.

FIG. 1 depicts a system 100 in accordance with an exemplary embodiment. System 100 includes a download server 102, a first group of gaming machines 104, a second group of gaming machines 106, and a network 108. Alternatively, system 100 may include a number of gaming machines groups that is greater than or less than two.

It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

Download server 102 may perform services (e.g., functions) for one or more gaming machines of the first group 104 and/or one or more gaming machines of the second group 106. For example, one of the services may include identifying a set of gaming machine software files to be transmitted to a given gaming machine of the first group 104. Other examples of services that the download server 102 may perform are also possible, some of which are described below.

Download server 102 may be co-located with (or located remote from) one or more gaming servers. The one or more gaming servers may perform services such as generating game results and providing the game results to one or more machines of the first group 104 and/or one or more machines of the second group 106.

The first group 104 includes a first gaming machine 110, a second gaming machine 112, and a third gaming machine 114. Alternatively, the first group 104 may include a number of gaming machines that is greater than or less than three.

The second group 106 includes a fourth gaming machine 116 and a fifth gaming machine 118. Alternatively, the second group 106 may include a number of gaming machines that is greater than or less than two.

The machines of the first group 104 may differ from machines of the second group 106. For example, each machine of the first group 104 may comprise two display screens, whereas each machine of the second group 106 may comprise only one display screen. Other examples of differences between machines of the first group 104 and machines of the second group 106 are described below.

Network 108 may be arranged in any of a variety of configurations, such as a configuration that includes the Internet. In particular, network 108 may be arranged in a configuration that includes a wireless network portion. The wireless network portion may include a wireless air interface for performing communications according to an air interface protocol such as the Bluetooth® protocol, a cellular air interface protocol (e.g., the code division multiple access CDMA protocol), the Institute of Electrical and Electronics Engineers (IEEE) 802.11 protocol, or some other air interface protocol.

Alternatively, or in combination, network 108 may include a wired network portion. The wired network portion may include one or more networks that include one or more electrical and/or optical conductors. The wired network portion may be arranged as a local area network (LAN), a wide area network (WAN), the public switched telephone network (PSTN), or some other type of wired network. Other exemplary configurations of network 108 are also possible.

Figure 2:
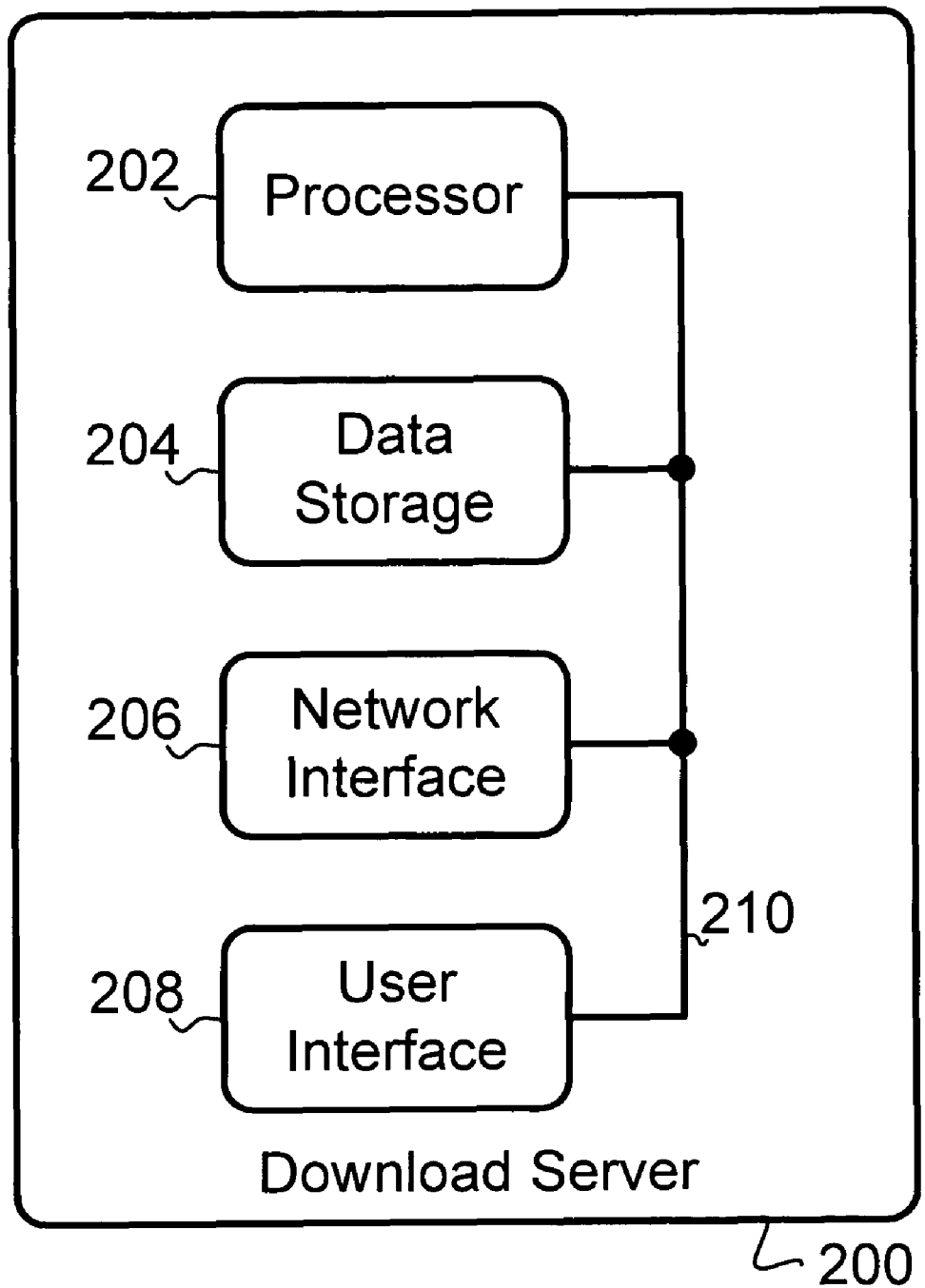
FIG. 2 illustrates an exemplary download server.

FIG. 2 depicts a download server 200 in accordance with an exemplary embodiment. Download server 200 may be arranged to distribute gaming machine software files to gaming machines in a manner that permits customization of each gaming machine in accordance with the requirements and/or desires of proprietors of gaming establishments where the gaming machines are located.

Download server 200 includes a processor 202, data storage 204, a network interface 206, and a user interface 208, all linked together via a system bus, network, or connection mechanism 210. Alternatively, a download server may comprise a set of program logic executable on a processor, such as the processor 202.

Processor 202 may comprise one or more processors (e.g., one or more general purpose processors and/or one or more digital signal processors). Processor 202 is arranged to carry out functions described herein, and may do so by executing program instructions and/or by interacting with data storage 204, network interface 206, user interface 208, and/or connection mechanism 210.

Data storage 204 comprises a computer readable medium. A computer readable medium may comprise volatile and/or non-volatile storage components, such as optical, magnetic, organic or other memory or disc storage, which can be integrated in whole or in part with a processor, such as processor 202. Alternatively, the entire computer readable medium may be separate from a processor and coupled to the processor by a connection mechanism, such as connection mechanism 210.

Data storage 204 may store various types of data. For example, data storage 204 may store program logic (e.g., program instructions) executable by processor 202. The program logic may be arranged such that, when executed, download server 200 carries out the functions described herein (e.g., functions described in section 3 entitled Exemplary Operation).

As another example, data storage 204 may store gaming machine software files for gaming machines of the first group 104 and for gaming machines of the second group 106. In particular, data storage 204 may store gaming machine software files in a hierarchical configuration, which is described below.

Network interface 206 provides means for interfacing to one or more networks. Interfacing to one or more networks may include transmitting messages and/or software files to the one or more networks, as well as, receiving messages and/or software files from the one or more networks. Network interface 206 may include a network interface card for interfacing to a wireless network and/or a wired network.

User interface 208 provides means for a user to interface with download server 200. Interfacing with download server 200 may include arranging download server 200 into any of a variety of configurations. For example, interfacing with download server 200 may include arranging gaming machine software files stored at download server 200 into the hierarchical configuration. In this way, download server 200 may function as a software administrative tool. Arranging the gaming machine software files may include moving stored files from one directory to another directory, deleting stored files, creating new directories, and deleting existing directories.

User interface 208 may be arranged as a graphical user interface (GUI). In this regard, user interface 208 may include a display, such as a liquid crystal display or a cathode ray tube display, for displaying the GUI. Other examples of user interface 208 are also possible.

Figure 3:
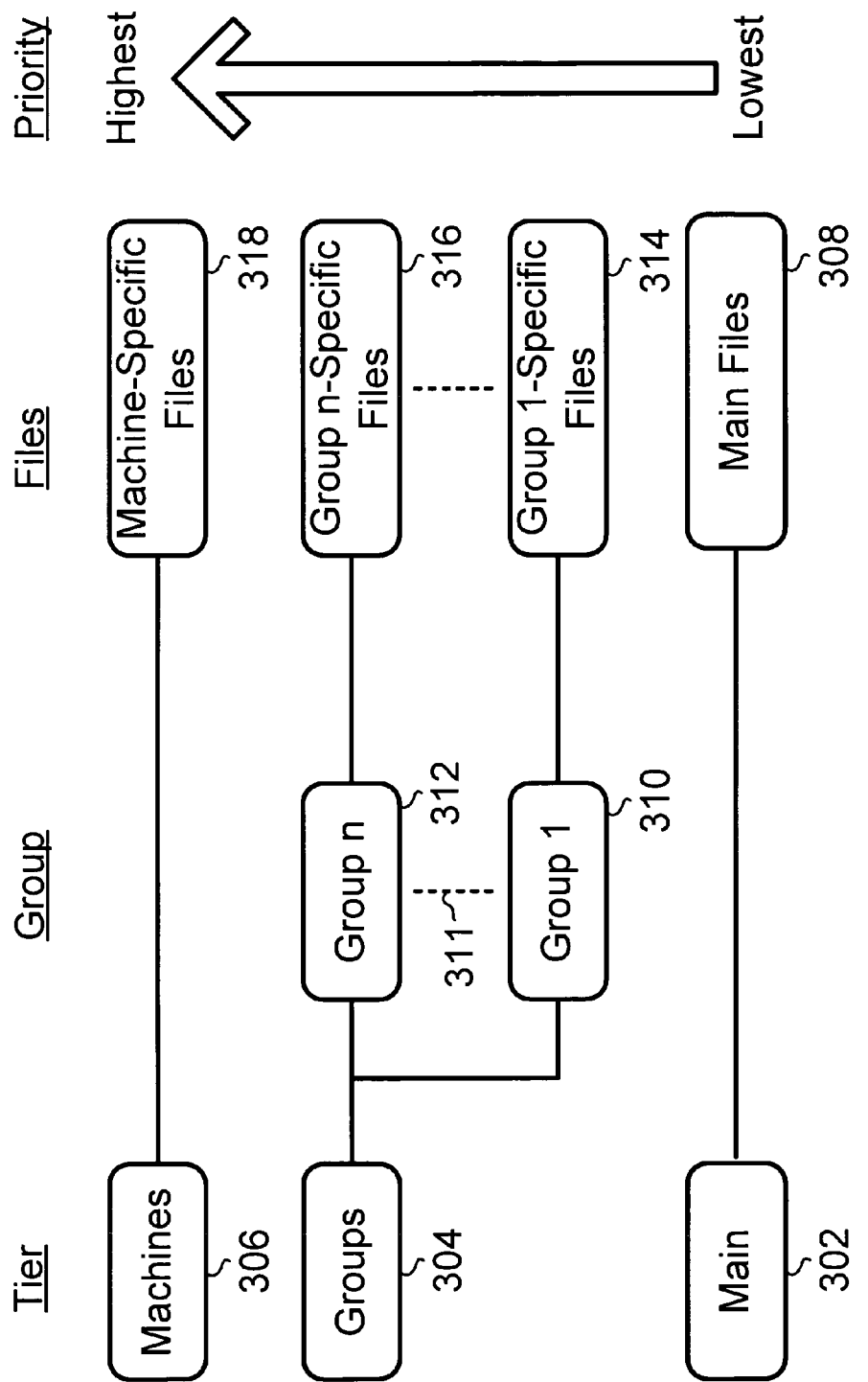
FIG. 3 illustrates a hierarchical file structure in accordance with an exemplary embodiment.

FIG. 3 depicts an exemplary hierarchical configuration comprising a three-tier file structure 300 for organizing gaming machine software files stored at data storage 204. As shown in FIG. 3, the three-tier file structure 300 includes a main tier 302, a groups tier 304, and a machines tier 306. The names of main tier 302, groups tier 304, and machines tier 306, are exemplary only, as different names may be used to identify each of the three tiers.

Main tier 302, groups tier 304, and machines tier 306 may each include one or more file directories. Each of the file directories may be associated with a list of one or more gaming machine software files. Each tier of three-tier file structure 300 includes gaming machine software files that relate to the particular tier.

Main tier 302 may include a standard set of software files that correspond to a default gaming machine configuration (hereinafter the "default configuration"). As an example, a gaming machine arranged according to the default configuration may comprise a Novomatic brand gaming machine that includes: (i) a particular set of input peripherals, (ii) a particular set of output peripherals, (iii) a single display screen, (iv) a particular coin hopper, (v) a 5-button pushbutton assembly, (iv) a particular bill acceptor, (vii) a particular tower light assembly, and (viii) a particular key switch. The default configuration may further comprise the standard set of software files. Other examples of the default configuration and other examples of the features included within the default configuration are also possible.

The standard set of software files may be loaded onto a given gaming machine so as to configure the given gaming machine in accordance with the default configuration. The standard set of software files allow the gaming machine to function with a default set of functionality. For example, the default set of functionality may include: (i) a default set of games such as roulette, blackjack, and a dice game, (ii) a default minimum bet size, such as $0.25, for any games of the default set of games, (iii) a default trademark that is displayed on a games menu, and (iv) a default attraction video sequence that is displayed on the gaming machine when the gaming machine is idle. Other examples of the default set of functionality are also possible.

Groups tier 304 may define one or more groups, such as a first group 310 and a second group 312. Each of the one or more groups may correspond to a particular machine-group configuration. Each machine-group configuration differs from the default configuration. For example, the first group 310 may correspond to a first machine-group configuration in which the gaming machines offer a default set of games offered in the default configuration, but with a minimum wager amount of $1.00 instead of a default wager amount of $0.25. As another example, the second group 312 may correspond to a second machine-group configuration in which gaming machines offer games with the default wager amount of $0.25, but also includes the game of bingo in addition to the default set of games.

Other examples of ways to characterize gaming machines for defining machine-group configurations include: (i) the quantity of user-interface buttons on the gaming machine, (ii) the quantity of display screens on the gaming machine, (iii) the set of games that may be played on the gaming machine, (iv) the branding (e.g., trademarks, logos) displayed on a games menu of the gaming machine, and/or (v) the attraction video sequence that plays on the gaming machine. In this way, for example, another group (not shown) may correspond to a group-machine configuration arranged as the default configuration except for being limited to gaming machines having a 12-button pushbutton assembly and two displays.

Each of the one or more defined groups of groups tier 304 may be associated with a corresponding group file directory. For example, group tier 304 may define a first group file directory 314 that corresponds to first group 310, and a second group file directory 316 that corresponds to second group 312.

A group file directory may include an index that identifies a particular set of gaming machines that correspond to the group file directory. Each index may identify one or more gaming machines. A gaming machine may be identified on more than one index such that the gaming machine is associated with more than one group.

The index may identify each gaming machine by a unique identification code associated with the gaming machine. The identification code for the gaming machine, by way of example, may comprise a login name and/or password that the gaming machine uses to log in to a gaming server. Other examples of the identification code are also possible.

A group file directory may include or be associated with a set of group-specific software files. The set of group-specific software files, in combination with the standard set of software files, may define a machine-group configuration for gaming machines associated with the group file directory. A gaming machine that receives software files in accordance with the machine-group configuration may provide a unique set of functionality that differs from the default set of functionality. The set of group-specific software files may include one or more software files.

Each of the defined groups may have a relative level of priority. As shown in FIG. 3, first group 310 is lower in priority than second group 312. The dashed line 311 represents that there may be one or more other groups between first group 310 and second group 312. Each of the one or more other groups has a priority level that is higher than the priority of first group 310, but lower than the priority of second group 312. By way of example, the one or more other groups may include a group 2, group 3, and group 4, such that the order of the groups from lowest priority to highest priority is first group 310, group 2, group 3, group 4, and second group 312.

The priority level of the groups (e.g., first group 310 and second group 312) may indicate the order in which the groups are applied to determine a group-specific configuration. For example, the gaming machine software files in first group 310, having the lowest priority, may be applied first and thus can be replaced (e.g., overridden) or supplemented by gaming machine software files of a subsequently applied group (e.g., second group 312). The gaming machine software files of a group that is applied last may have the highest priority and thus can replace or supplement software files that have been applied for all preceding groups. Other methods for prioritizing the gaming machine software files to determine which files may be replaced or supplemented are also possible.

Machines tier 306 may include one or more machine file directories such as the machine file directory 318. Each of the one or more machine file directories corresponds to a respective gaming machine (e.g., first gaming machine 110). Machines tier 306 will be described with respect to first gaming machine 110 and machine file directory 318. Those skilled in the art will understand that a similar description is applicable to other gaming machines and other machine file directories as well.

Machine file directory 318 may include and/or be associated with: (i) an identification code for first gaming machine 110, and/or (ii) one or more gaming machine software files corresponding to first gaming machine 110. The one or more software files in machine file directory 318 may replace or supplement software files in main tier 302 and/or software files in a group file directory of any group that corresponds to first gaming machine 110.

Machine file directory 318, in combination with main tier 302 and groups file directories that correspond to first gaming machine 110, define, at least in part, a gaming machine configuration (i.e., a machine-level configuration) that is unique to first gaming machine 110. The unique gaming machine configuration differs from the default configuration, as well as each of the one or more machine-group configurations defined by the groups tier 304. The software files of machine file directory 318 may replace and/or supplement software files of main tier 302 and/or software files of groups tier 304 corresponding to first gaming machine 110, so as to establish a machine-level configuration for first gaming machine 110. The software files corresponding to a machine-level configuration, when loaded on first gaming machine 110, allow first gaming machine 110 to function with the desired functionality.

The one or more gaming machine software files corresponding to first gaming machine 110 may be transmitted, via network 108, to first gaming machine 110, and subsequently stored at first gaming machine 110. Executing at least one of the software files corresponding to first gaming machine 110 allows first gaming machine 110 to perform functions of a unique set of functions that are unlike the set of functions found on any other gaming machine. As an example, the unique set of functions may comprise gaming functions having a time-dependent minimum wager amount, such as a first minimum wager amount of $0.25 between the hours of 10:00 AM and 4:59 PM and a second minimum wager amount of $1.00 between the hours of 5:00 PM and 2:00 AM.

The main tier 302, the groups tier 304, and the machines tier 306, establish a hierarchy of software files for gaming machines. The software files that correspond to main tier 302 have a priority that is lower than the priority of other software files in the three-tier file structure 300.

Software files in groups tier 304 have a priority that is (i) higher than the priority of the software files in main tier 302, and (ii) lower than the priority of software files in machines tier 306. As such, software files in groups tier 304 may be replacement files for software files in main tier 302 or may supplement software files in the main tier 302.

Software files in machines tier 306 have a priority that is higher than the priority of software files in either main tier 302 or groups tier 304. As such, software files in machines tier 306 may be (i) replacement files for software files in main tier 302 and/or software files in groups tier 304, or (ii) files that supplement software files in the main tier 302 and/or software files in the groups tier 304.

In accordance with an exemplary embodiment, a given gaming machine may be identified as "gaming machine X." Gaming machine X may be a gaming machine that corresponds to a machine-level configuration that includes a machine file directory corresponding to gaming machine X, but does not correspond to any groups or group file directories of groups tier 304. In this way, the machine-level configuration for gaming machine X includes (i) the standard set of software files of main tier 302, and (ii) the software files identified in the machine file directory corresponding to gaming machine X. Stated another way, there are no software files in a groups file directory that may (i) replace or supplement the standard set of software files for gaming machine X, or (ii) be replaced or supplemented by the software files identified in the machine file directory corresponding to gaming machine X.

Figure 4:
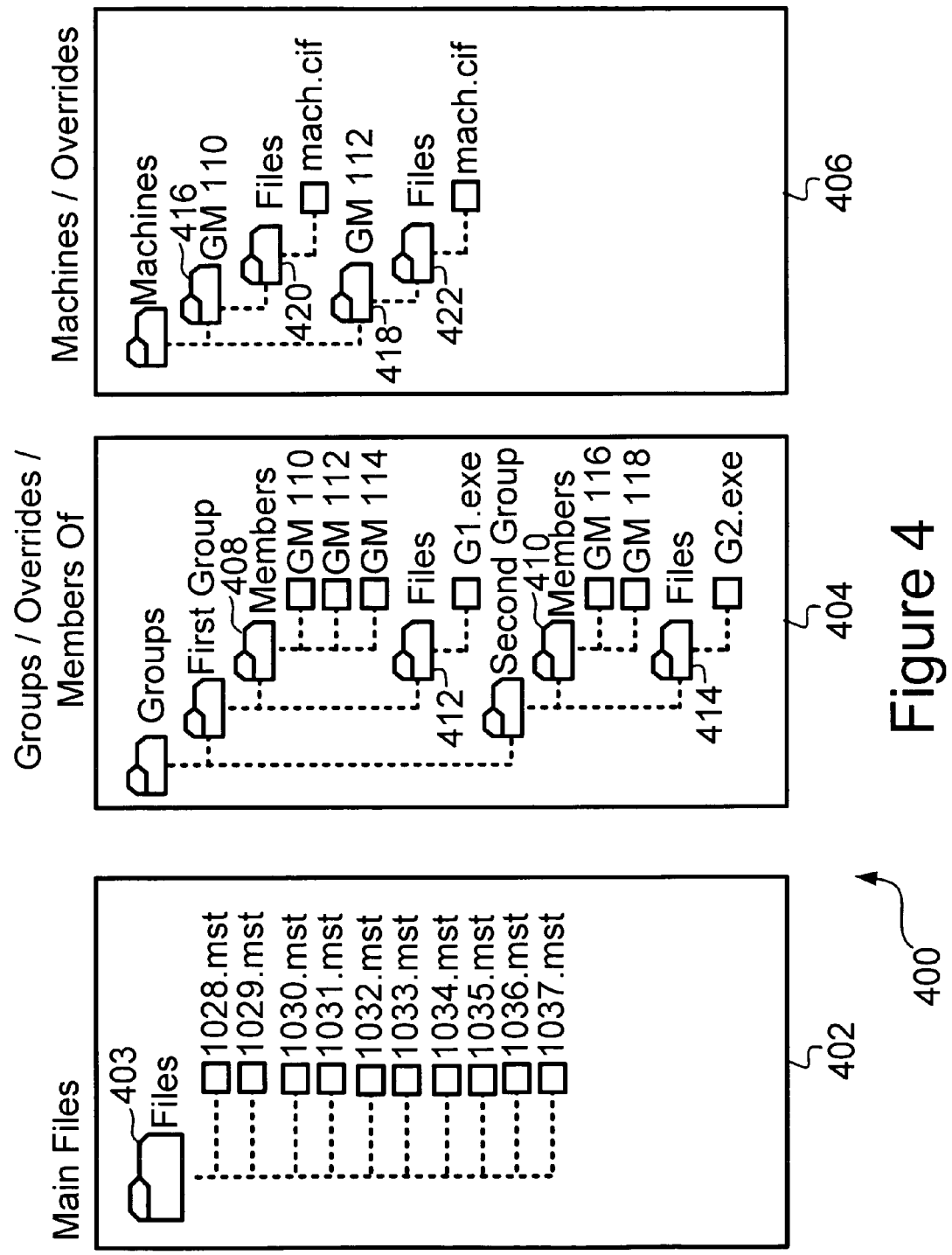
FIG. 4 illustrates exemplary file directories.

FIG. 4 illustrates an exemplary GUI display 400 for download server 200. In particular GUI display 400 depicts a main file directory 402 for main tier 302, group directories 404 for groups tier 304, and machine directories 406 for machines tier 306. Main file directory 402 includes a first files folder 403 that includes ten software files identified as 1028.mst through 1037.mst. Alternatively, the first files folder 403 may include a number of software files that is greater than or less than ten. The software files in the first files folder 403, and consequently in main file directory 402, are default software files.

Group directories 404 defines (i) a first group that includes first gaming machine (GM) 110, second gaming machine 112, and third gaming machine 114, as members, and (ii) a second group that includes fourth gaming machine 116 and fifth gaming machine 118, as members. A members folder 408 may include identification codes for first gaming machine 110, second gaming machine 112, and third gaming machine 114. Similarly, a members folder 410 may include identification codes for fourth gaming machine 116 and fifth gaming machine 118.

A files folder may correspond to a given group and include software files that correspond to the given group. As an example, a second files folder 412 corresponds to the first group and includes a software file entitled G1.exe. As another example, a third files folder 414 corresponds to the second group and includes a software file entitled G2.exe. Alternatively, the second files folder 412 and the third files folder 414 may include a number of software files that is greater than or less than one. The software files in the second files folder 412 and the third files folder 414 may replace or supplement the default software files contained in main file directory 402.

Machines directory 406 includes (i) a first machine folder 416 that identifies first gaming machine 110, and (ii) a second machine folder 418 that identifies second gaming machine 112. The first machine folder 416 includes a fourth files folder 420 that includes a software file entitled mach.cif. The second machine folder 418 includes a fifth files folder 422 that includes the software file entitled mach.cif. Alternatively, the fourth files folder 420 and the fifth files folder 422 may include a number of files that is greater than or less than one. Moreover, the fourth files folder 420 may include software files that differ from the software files of the fifth files folder 422.

Figure 5:
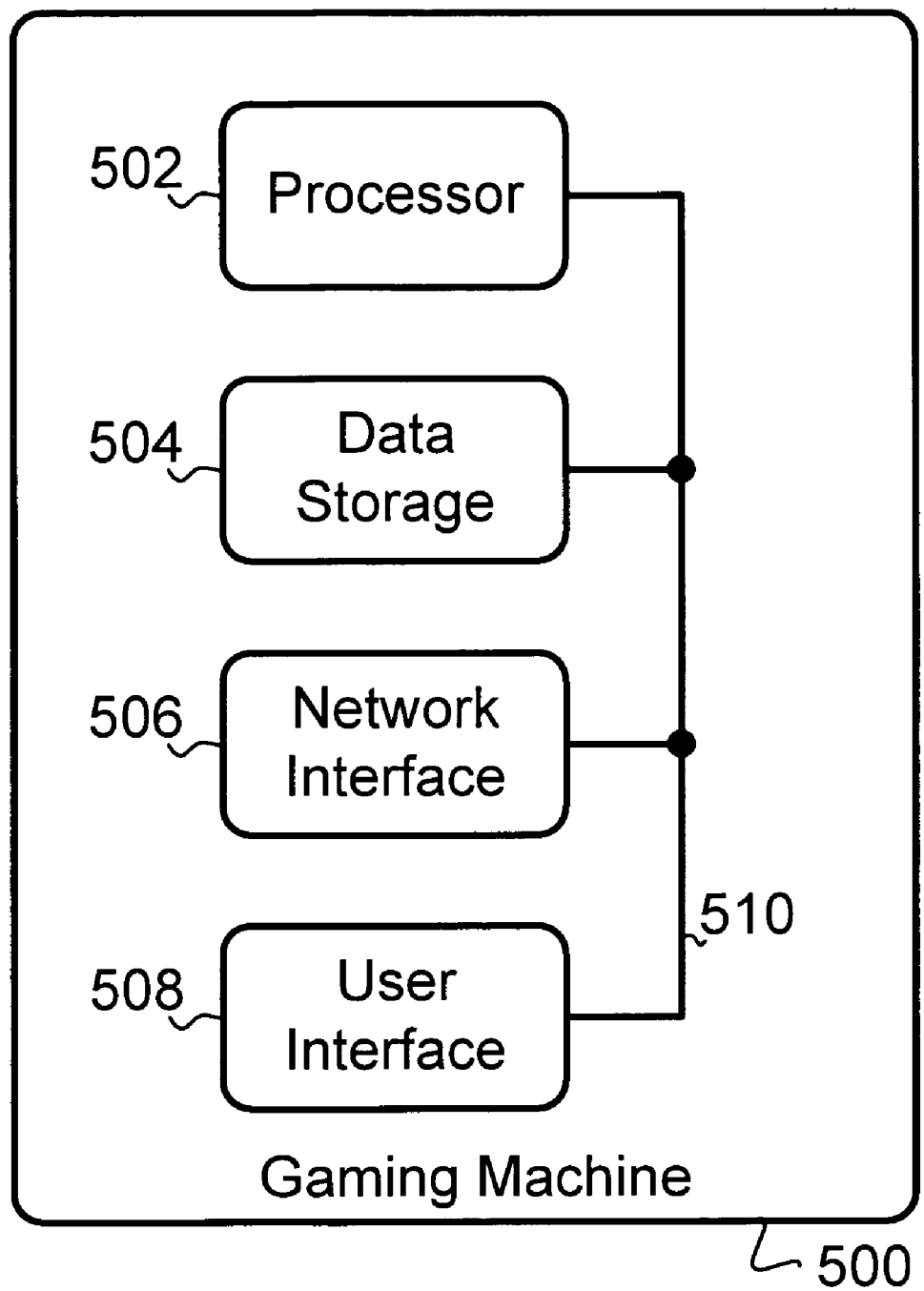
FIG. 5 illustrates an exemplary gaming machine.

FIG. 5 depicts a gaming machine 500 in accordance with an exemplary embodiment. Gaming machine 500 may be arranged as a server-based gaming machine. A server-based gaming machine may rely on a separate gaming server to perform certain gaming functions and to provide gaming results to the gaming machine. For example, a gaming server may include a random number generator (RNG) for use in performing a variety of games. Alternatively, gaming machine 500 may be arranged as a stand-alone gaming machine. A stand-alone gaming machine may include means for carrying out games. Such means may include a local RNG within gaming machine 500.

Gaming machine 500 may be arranged to allow a player to play any of a variety of games. For example, gaming machine 500 may be arranged to allow a player to play slot games, dice games, electronic scratch ticket-type games, or card games such as poker, black jack or bridge. Other exemplary games a player can play using gaming machine 500 are also possible.

Gaming machine 500 includes a processor 502, data storage 504, a network interface 506, and a user interface 508, all linked together via a system bus, network, or connection mechanism 510. Any or all of the first gaming machine 112, the second gaming machine 114, the third gaming machine 116, the fourth gaming machine 118, and the fifth gaming machine 120, may be arranged as gaming machine 500.

Processor 502 may comprise one or more processors. Processor 502 is arranged to carry out functions described herein, and may do so by executing program instructions and/or by interacting with data storage 504, network interface 506, user interface 508, and/or connection mechanism 510.

Data storage 504 is a computer-readable medium. Data storage 504 may store various types of data. For example, data storage 504 may store program logic that is executable by processor 502. The program logic may be arranged such that, when executed, gaming machine 500 carries out certain functions as described herein (e.g., functions described in section 3 entitled Exemplary Operation).

As another example, data storage 504 may store gaming machine software files that correspond to gaming machine 500. In particular, data storage 504 may store the gaming machine software files that have been transmitted to gaming machine 500 from download server 200 over a network.

Network interface 506 provides means for interfacing to one or more networks. Network interface 506 may include a network interface card for interfacing to a wireless network and/or a wired network.

User interface 508 provides means for a user to enter data into and/or receive data from gaming machine 500. User interface 508 may be arranged in various configurations. For example, user interface 508 may be arranged to have one or more displays for displaying an attraction video sequence, a video sequence for playing a game, a games menu, and/or other images. As another example, user interface 508 may be arranged with a particular combination of knobs, buttons, and/or switches, for use in playing games, turning gaming machine 500 on or off, and a variety of other functions. Other examples arrangements of user interface 508 are also possible.

3. Exemplary Operation

Figure 6:
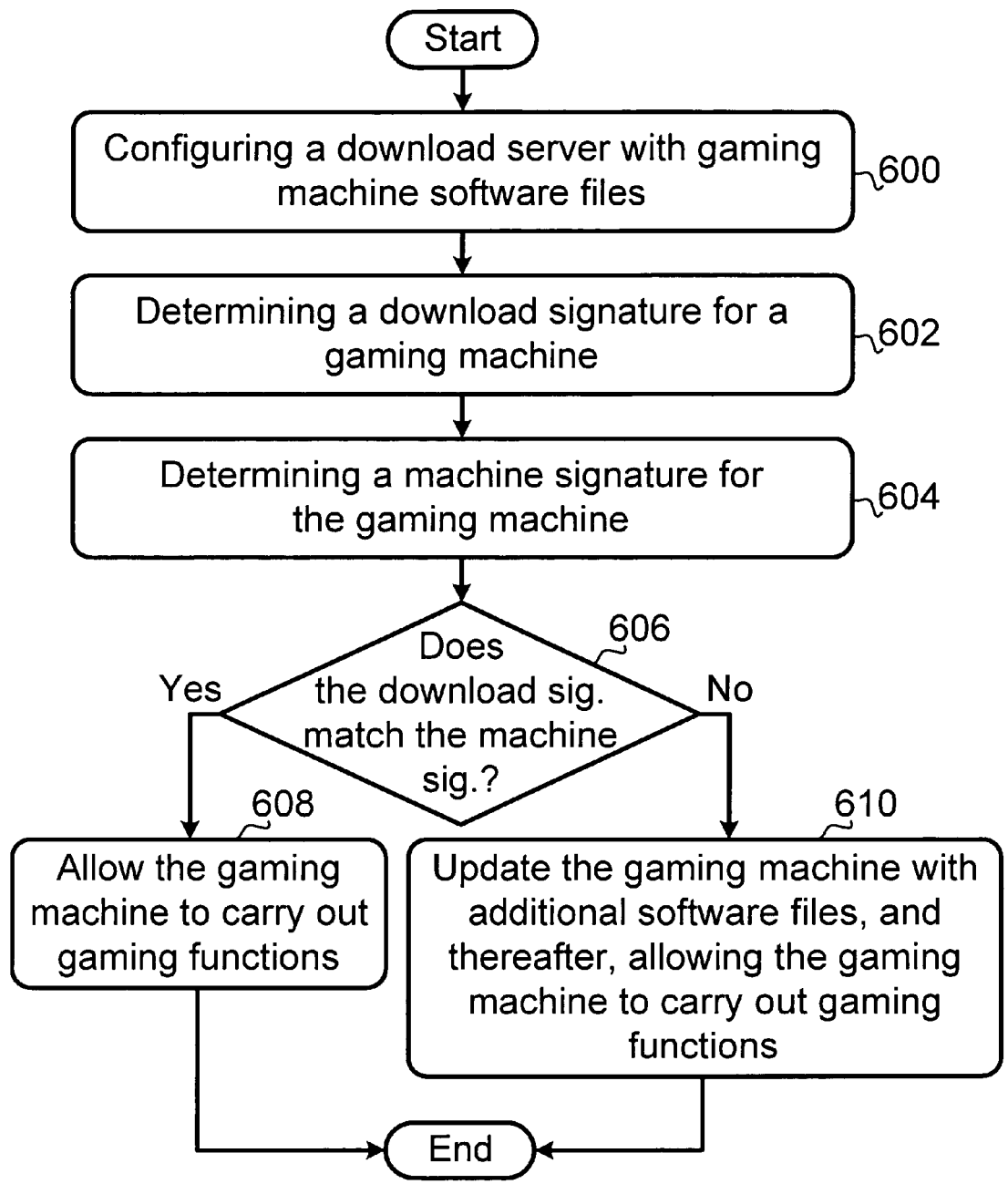
FIG. 6 is a flow chart depicting a set of functions that can be carried out in accordance with an exemplary embodiment.

FIG. 6 is a flow chart provided to illustrate some of the functions that may be carried out in accordance with exemplary embodiments of the present invention. The functions shown in FIG. 6 may be carried out in an order as shown in the figure (i.e., from top to bottom). Alternatively, the functions shown in FIG. 6 may be carried out in a different order and/or two or more of the functions may be carried out in combination. FIG. 6 will be explained with reference to download server 200 of FIG. 2, the three-tier file structure 300 shown in FIG. 3, and gaming machine 500 of FIG. 5.

As shown in FIG. 6, block 600 includes configuring download server 200 with gaming machine software files. Configuring download server 200 may include use of user interface 208 to direct storage of gaming machine software files into data storage 204, and, to arrange the stored gaming machine software files into file directories of main tier 302, groups tier 304, and/or machines tier 306. Configuring download server 200 with gaming machine software files may be carried out according to the desires of proprietors that operate the gaming machines that execute the gaming machine software files.

Configuring download server 200 may also include defining a new group for groups tier 304, modifying an existing file directory of groups tier 304, and/or removing an existing file directory of groups tier 304. Similarly, configuring download server 200 may include defining a new file directory for machines group 304, modifying an existing file directory of machines group 304, and/or removing an existing file directory of machines group 304. Other examples of configuring download server 200 are also possible.

Next, block 602 includes determining a download signature for gaming machine 500. Determining the download signature may occur for various reasons. For example, determining the download signature may occur in response to one or more gaming machine software files being: (i) stored at data storage 204, (ii) deleted (i.e., removed) from data storage 204, or (iii) moved from a first file directory to a second file directory within data storage 204. As another example, determining the download signature may occur in response to download server 200 receiving, from gaming machine 500, a request for a download signature. Other exemplary reasons for determining the download signature are also possible.

Determination of the download signature may be carried out in various ways. For example, after determining which software files are associated with gaming machine 500, download server 200 may execute program logic for performing a hashing function. Determining which software files are associated with gaming machine 500 may be carried out by download server 200 executing program logic to scan file directories in main tier 302, groups tier 304, and/or machines tier 306. Scanning of the file directories may include scanning an index for each file directory so as to determine whether the identification code associated with gaming machine 500 is included on the index.

Execution of program logic for performing the hashing function may result in determining the download signature for gaming machine 500. As an example, program logic for performing the hashing function may be arranged to determine the download signature according to the Message Digest 5 (MD5) algorithm, the Secure Hash Algorithm 1 (SHA-1), or the Secure Hash Algorithm 256. In this way, the download signature may include a 128-bit digital signature, a 160-bit digital signature, and a 256-bit digital signature, respectively. Other examples of program logic for performing the hashing function are also possible.

After determining the download signature for gaming machine 500, the download signature may be stored in data storage 204. In particular, and by way of example, the download signature may be stored in an index associated with a file directory of main tier 302, groups tier 304, or machines tier 306. For example, if machines tier 306 includes a file directory for gaming machine 500, the download signature may be stored in an index of the file directory for gaming machine 500.

In addition to determining the download signature for gaming machine 500, download server 200 may determine download signatures for a plurality of gaming machines. Each of these download signatures may be determined using the program logic for performing a hashing function, as described above. Each of these download signatures may be stored in an index for a respective file directory that corresponds to a particular gaming machine. In this way, if a first gaming machine is to operate according to the default set of functionality, then the download signature for the first gaming machine may be stored in an index of the main tier 302. Further, if a second gaming machine is to operate according to a set of functionality defined by a given group file directory, then the download signature for the second gaming machine may be stored in an index for the given group file directory.

Next, block 604 includes determining a machine signature for gaming machine 500. Determining the machine signature may occur for various reasons. For example, determining the machine signature may occur in response to (i) gaming machine 500 establishing a communication session with download server 200, (ii) gaming machine 500 receiving, from download server 200, a request to determine the machine signature, (iii) gaming machine 500 being powered on from an off state, and/or (iv) gaming machine 500 executing reset program logic. Other exemplary reasons for determining the machine signature are also possible.

Determination of the machine signature may be carried out in various ways. For example, gaming machine 500 may determine the machine signature by executing program logic for performing a hashing function. The hashing function may be performed on the set of gaming machine software files that are stored in data storage 504. The hashing function may include scanning the gaming machine software files stored in data storage 504.

The hashing function performed by gaming machine 500 should be the same hashing function performed by download server 200 to determine the download signature. In this way, the machine signature may include a 128-bit digital signature, a 160-bit digital signature, or a 256-bit digital signature. After determining the machine signature for gaming machine 500, the machine signature may be stored in data storage 504.

Next, block 606 includes determining whether the download signature matches the machine signature. This determination may be carried out using any of a variety of methods. For example, this determination may be carried out in gaming machine 500. In order for gaming machine 500 to make this determination, download server 200 may transmit the download signature to gaming machine 500 over a network, such as network 108. Download server 200 may transmit the download signature in response to a request for the download signature or in response to some other communication from gaming machine 500. Alternatively, download server 200 may transmit the download signature for some other reason, such as in response to download server 200 determining the download signature.

As another example, the determination whether the download signature matches the machine signature may be carried out in download server 200. In order for download server 200 to make this determination, gaming machine 500 may transmit the machine signature to download server 200 over a network, such as network 108. Gaming machine 500 may transmit the machine signature in response to a request for the machine signature or in response to some other communication from download server 200. Alternatively, gaming machine 500 may transmit the machine signature for some other reason, such as in response to gaming machine 500 determining the machine signature.

Making the determination whether the download signature matches the machine signature may be carried out by comparing the download signature to the machine signature. Any method known for comparing two numbers and for providing an indication whether a first of the two numbers matches a second of the two numbers may be used for the comparison. The entity making the comparison (e.g., download server 200 or gaming machine 500) may store a record each time a comparison is made and the results of each comparison (i.e., each determination).

In the example, where gaming machine 500 receives the download signature from download server 200, gaming machine 500 may store the download signature in data storage 504. In this way, if, after storing the download signature, gaming machine 500 can not communicate with download server 200 due to a failure in download server 200, a failure in network 108, or for some other reason, then gaming machine 500 may use the stored download signature for comparing to the machine signature.

In accordance with the most recent example, if gaming machine 500 does not receive another download signature after storage of the stored download signature and gaming machine 500 begins a boot sequence after powering on from the off state, then gaming machine 500 may compare a machine signature to the stored download signature. If the two signatures match, then gaming machine 500 continues the boot sequence, and thereafter, gaming machine 500 may enter a state in which gaming functions may be carried out. If the two signatures do not match, the boot sequence terminates and gaming machine 500 does not enter a state in which gaming functions may be carried out.

To carry out the function of block 606, or for another reason, a communication session between download server 200 and gaming machine 500 may need to occur. In one respect, gaming machine 500 may initiate the communication session. For example, gaming machine 500 may initiate the communication session in response to executing reset program logic (e.g., a "boot-up" sequence) after (i) a power source is connected or reconnected to the gaming machine, or (ii) gaming machine 500 is turned on via a switch. Other examples of gaming machine 500 initiating the communication session are also possible.

In another respect, download server 200 may initiate the communication session. For example, download server 200 may initiate the communication session after download server 200 has received a new machine-level configuration for gaming machine 500 or a change to an existing machine-level configuration for gaming machine 500. Other examples of why download server 200 may initiate the communication session are also possible.

Initiating the communication session may include sending a first message. For example, the first message may comprise a message for establishing a secure communication session in which encrypted messages are sent between download server 200 and gaming machine 500. As another example, the first message may comprise a download signature or a machine signature and an identification code of gaming machine 500. Other examples of the first message are also possible. After communication of the first message, other messages may then be transmitted between download server 200 and gaming machine 500.

Next, block 608 includes allowing gaming machine 500 to carry out gaming functions. The function of block 608 is carried out if the determination of block 606 indicates the download signature matches the machine signature. If the download signature matches the machine signature, then the gaming machine software files stored at data storage 504 match the gaming machine software files corresponding to one or more file directories associated with gaming machine 500.

If the determination of block 606 is made at gaming machine 500, then gaming machine 500 can execute program logic that changes operation of gaming machine 500 from a first state in which gaming functions may not be carried out to a second state in which gaming functions may be carried out. For example, the program logic may include changing a value of a software flag from a value that indicates gaming machine 500 should function in the first state to a value that indicates gaming machine 500 should function in the second state. Other examples of executing program logic that allows gaming functions to be carried out are also possible.

Alternatively, if the determination of block 606 is made at download server 200, then download server 200 may transmit, to gaming machine 500, a message that indicates that gaming machine 500 may carry out gaming functions. The message may indicate include an instruction for gaming machine 500 to switch to the second state and/or that the download signature matches the machine signature. In response to receiving this message, gaming machine 500 may execute program logic to allow gaming functions to be carried out. Such program logic may be arranged as the program logic for changing operation of gaming machine 500 from the first state to the second state.

Carrying out gaming functions may include any of a variety of functions. For example, carrying out gaming functions may include providing a games menu that allows a user to select a game to be played and allowing the user to play the selected game, displaying a trademark with the games menu, and/or displaying an attractions video. Other examples of the various functions performed in carrying out gaming functions are also possible.

Next, block 610 includes updating gaming machine 500 with additional software files, and thereafter, allowing gaming machine 500 to carry out gaming functions. These functions are carried out if the determination of block 606 indicates the download signature does not match the machine signature, or in other words, if the software files on gaming machine 500 do not correspond to the software files on download server 200 and that are included in a software file configuration for gaming machine 500. The mismatch of files between download server 200 and gaming machine 500 could be due to a change of one or more software files at download server 200 or to an accidental or deliberate change to one or more software files on gaming machine 500.

Updating gaming machine 500 may include download server 200 sending one or more gaming machine software files to gaming machine 500 during a communication session established between download server 200 and gaming machine 500. After gaming machine 500 receives the one or more gaming machine software files, gaming machine 500 can store the files at data storage 504. Storage of these files may include replacing (i.e., overwriting other files previously stored at data storage 504. After storage of the one or more gaming machine software files, gaming machine 500 may switch to the second state in which gaming functions may be carried out.

Download server 200 may determine which gaming machine software files get sent to gaming machine 500. Download server 200 may make this determination by scanning the file directories (of main tier 302, groups tier 304, and machines tier 306) that correspond to gaming machine 500.

For example, if gaming machine 500 is to be arranged as a gaming machine having a default configuration, then a scan of the file directories will indicate that only the files of the main file directory need to be installed on gaming machine 500. Download server 200 could send all gaming machine software files corresponding to the main file directory.

Alternatively, download server 200 could send a subset of all gaming machine software files corresponding to the main file directory, so as to only send gaming machine software files that are not already stored at gaming machine 500. In accordance with this alternative, download server 200 may compare the software files currently stored at gaming machine 500 to the software files corresponding to the main file directory, and subsequently send gaming machine 500 only those files of the main file directory that are not currently stored at gaming machine 500.

As another example, if gaming machine 500 is to be arranged as a gaming machine having a group-level configuration, then a scan of the file directories will indicate that only the files of the main file directory and files of one or more group file directories corresponding to gaming machine 500 need to be installed on gaming machine 500. Download server 200 could send gaming machine 500 all gaming machine software files corresponding to (i) the main file directory, and (ii) the one or more group file directories.

Alternatively, download server 200 could send gaming machine 500 a subset of all gaming machine software files corresponding to the main file directory and the one or more group file directories, so as to only send gaming machine software files that are not already stored at gaming machine 500. In accordance with this alternative, download server 200 may compare the software files currently stored at gaming machine 500 to the software files corresponding to the main file directory and the one or more group file directories, and subsequently send gaming machine 500 only those files of the main file directory and one or more group file directories that are not currently stored at gaming machine 500.

As yet another example, if gaming machine 500 is to be arranged as a gaming machine having a machine-level configuration, then a scan of the file directories will indicate which files of the main file directory, files of one or more group file directories corresponding to gaming machine 500, and files of a machine file directory need to be installed on gaming machine 500. Download server 200 could send all gaming machine software files corresponding to (i) the main file directory, (ii) the one or more group file directories, and (iii) the machine file directory.

Alternatively, download server 200 could send a subset of all gaming machine software files corresponding to the main file directory, the one or more group file directories corresponding to gaming machine 500, and the machine file directory, so as to only send gaming machine software files that are not already stored at gaming machine 500. In accordance with this alternative, download server 200 may compare the software files currently stored at gaming machine 500 to the software files corresponding to the main file directory, the one or more group file directories, and the machine file directory, and subsequently send gaming machine 500 only those files of the main file directory, the one or more group file directories, and the machine file directory that are not currently stored at gaming machine 500.

4. Conclusion

The invention provides systems and methods for pushing software files from a download server to a number of different freestanding gaming machines. This enables customization of gaming machines at the machine level. By appropriate use of groups and machine override software files, proprietors of gaming machine establishments can configure their free-standing gaming machines to have, without limitation, (i) any one or more customized game menus (e.g., a corporate name and logo included on the game menu or a color scheme that matches the brand of the gaming establishment), (ii) a customized attraction video sequence (e.g., a video sequence that includes a corporate logo or a seasonal greeting at appropriate times) that plays on the gaming machines when they are idle, (iii) an ability to specify a different choice of games per gaming machine, and (iv) an ability to set minimum wagers on each game one each gaming machine.

Exemplary embodiments of the present invention have been described above. Those skilled in the art will understand, however, that changes and modifications may be made to the embodiments described without departing from the true scope and spirit of the present invention, which is defined by the claims.

We claim:

1. A download server for customizing a given gaming machine, the download server comprising:
   a first processor that executes, at the download server, program instructions; and
   a computer-readable medium storing the program instructions executed by the first processor and gaming machine software files executable by a second processor at the given gaming machine,
   wherein execution of the program instructions causes the first processor to arrange the executable gaming machine software files into a hierarchical structure comprising a first tier, a second tier, and a third tier, and wherein the hierarchical structure is stored within the computer-readable medium,
   wherein the first tier comprises executable gaming machine software files corresponding to a default configuration executable gaming machine software files for the given gaming machine,
   wherein the second tier comprises (i) a first members folder including a plurality of identification codes that uniquely identify a first group of multiple gaming machines including the given gaming machine, and (ii) a first files folder including executable gaming machine software files corresponding to a group-level configuration of executable gaming machine software files for the first group of gaming machines including the given gaming machine,
   wherein the third tier comprises executable gaming machine software files corresponding to a machine-level configuration of executable gaming machine software files for the given gaming machine,
   wherein the group-level configuration is higher in priority than the default configuration, and
   wherein the machine-level configuration is higher in priority than both the default configuration and the group-level configuration.

2. The download server of claim 1, wherein the executable software files corresponding to the default configuration are downloadable to the given gaming machine to configure the given gaming machine in accordance with the default configuration.

3. The download server of claim 2,
   wherein the second tier includes a group file directory for storing the executable gaming machine software files of the second tier, and
   wherein each executable gaming machine software file of the second tier is (i) a replacement file for an executable gaming machine software file of the first tier, or (ii) a software file that supplements the first tier of executable gaming machine software files.

4. The download server of claim 3,
   wherein the third tier includes a machine file directory for storing the executable gaming machine software files of the third tier, and
   wherein each executable gaming machine software file of the third tier is (i) a replacement file for an executable gaming machine software file of the first tier or the second tier, or (ii) a software file that supplements the first tier of executable gaming machine software files or the second tier of executable gaming machine software files.

5. The download server of claim 4, wherein at least one of the machine software files is for establishing a specific wager amount for a game playable with the given gaming machine.

6. The download server of claim 4, wherein at least one of the machine software files is for establishing a time-dependent wager amount for a game playable with the given gaming machine.

7. The download server of claim 1,
   wherein the program instructions include instructions for determining a download signature for the given gaming machine, and
   wherein the download signature represents software files corresponding to the given gaming machine and which are stored in (i) a first file directory within the first tier, (ii) a second file directory in the second tier, and (iii) a third file directory within the third tier.

8. The download server of claim 7,
   wherein the program instructions further include instructions for comparing the download signature to a machine signature of the given gaming machine, and responsively sending the given gaming machine at least one of the software files corresponding to the given gaming machine if the download signature does not match the machine signature.

9. The download server of claim 7,
   wherein the instructions for determining the download signature are arranged to perform a message digest 5 (MD5) hashing.

10. The download server of claim 1,
    wherein the second tier corresponds to one or more other group-level configurations, and
    wherein the third tier corresponds to one or more other machine-level configurations.

11. The download server of claim 10,
    wherein the given gaming machine corresponds to the machine-level configuration, and
    wherein the given gaming machine corresponds to the group-level configuration and at least one of the one or more other group-level configurations.

12. A method for customizing a gaming machine, the method comprising:
    determining, at a download server from a hierarchical structure comprising a first tier, a second tier, and a third tier stored at the download server, a download signature associated with a first gaming machine,
    wherein the first tier comprises executable gaming machine software files corresponding to a default configuration of the first gaming machine,
    wherein the second tier comprises (i) a first members folder including a plurality of identification codes that uniquely identify a first group of multiple gaming machines including the first gaming machine, and (ii) a first files folder including executable gaming machine software files corresponding to a group-level configuration for the first group of gaming machines including the first gaming machine, wherein the third tier comprises executable gaming machine software files corresponding to a machine-level configuration of the first gaming machine, wherein the group-level configuration is higher in priority than the default configuration, and wherein the machine-level configuration is higher in priority than both the default configuration and the group-level configuration;

receiving, at the first gaming machine from the download server, the download signature that is associated with the first gaming machine;

determining, at the first gaming machine, a machine signature for executable gaming machine software files stored at the first gaming machine; and determining, at the first gaming machine, whether the machine signature matches the download signature, wherein if the first gaming machine determines that the machine signature matches the download signature, then the first gaming machine responsively transitions from operating in a state that does not allow the first gaming machine to carry out gaming to a state that allows the first gaming machine to carry out gaming, wherein if the first gaming machine determines that the machine signature does not match the download signature, then prior to the first gaming machine transitioning from the state that does not allow the first gaming machine to carry out gaming to the state that allows the first gaming machine to carry out gaming, the first gaming machine responsively: (i) notifying the download server that the machine signature does not match the download signature, (ii) receiving a software package for updating the first gaming machine, and (iii) updating the first gaming machine with the software package, and wherein the software package received by the first gaming machine comprises at least one executable gaming machine software file contained within the hierarchical structure.

13. The method of claim 12, further comprising:

prior to the gaming machine receiving the download signature, the gaming machine establishing a communications session with the download server and requesting that the download server transmit the download signature to the gaming machine, wherein the gaming machine is a given type of gaming machine;

wherein the download server determines the download signature from the hierarchical file structure, wherein the first tier includes a set of default software files for any gaming machine of the given type of gaming machine, wherein the second tier includes at least a first set of customized software files for a first group of gaming machines, wherein the group of gaming machines are all of the given type of gaming machine, and wherein the third tier includes a second set of customized software files for the gaming machine.

14. The method of claim 13, wherein the second tier includes one or more additional sets of customized software files for one or more other groups of gaming machines, and wherein each of the one or more other groups of gaming machines includes only gaming machines of the given type of gaming machine.

15. The method of claim 14, wherein the gaming machine corresponds to an identification code, and wherein the identification code is used to indicate that the gaming machine corresponds to the first set of customized software files.

16. The method of claim 13, wherein the gaming machine corresponds to an identification code, and wherein the identification code is used to indicate that the gaming machine corresponds to the second set of customized software files.

17. A method for customizing a gaming machine, the method comprising:

receiving, at a download server from a first gaming machine, a machine signature associated with the first gaming machine;

determining, at the download server, a hierarchical structure comprising a first tier, a second tier, and a third tier, wherein the first tier includes executable gaming machine software files corresponding to a default configuration of the first gaming machine, wherein the second tier comprises (i) a first members folder including a plurality of identification codes that uniquely identify a first group of multiple gaming machines including the first gaming machine, and (ii) a first files folder including executable gaming machine software files corresponding to a group-level configuration for the first group of gaming machines including the first gaming machine, wherein the third tier comprises executable gaming machine software files corresponding to a machine-level configuration of the first gaming machine, determining, at the download server from the hierarchical structure, a download signature for the first gaming machine, and determining, at the download server, whether the machine signature matches the download signature, wherein the group-level configuration is higher in priority than the default configuration, and wherein the machine-level configuration is higher in priority than both the default configuration and the group-level configuration, wherein if the download server determines that the machine signature matches the download signature, then the download server responsively transmitting to the first gaming machine a communication that causes the first gaming machine to transition from operating in a state that does not allow the first gaming machine to carry out gaming to a state that allows the first gaming machine to carry out gaming, wherein if the download server determines that the machine signature does not match the download signature, then the download server responsively transmitting to the first gaming machine a software package for updating the first gaming machine to a software configuration associated with the download signature, and wherein the software package transmitted to the first gaming machine comprises at least one executable gaming machine software file contained within the hierarchical structure.

18. The method of claim 17, wherein the download server determines the download signature for the gaming machine by performing a hash encryption of a software file configuration for the gaming machine.

19. The method of claim 18, wherein performing the hash encryption includes performing an MD5 hash encryption.

20. The method of claim 18, wherein the software file configuration includes: (i) software files that correspond to a default configuration, (ii) software files that correspond to a group-level configuration, and (iii) software files that correspond to a machine-level configuration.

21. A system for customizing a gaming machine, the system comprising:

a first gaming machine that determines a machine signature of the first gaming machine;

a download server to determine, from a hierarchical structure comprising a first tier, a second tier, and a third tier, a download signature associated with the first gaming machine, wherein the first tier includes executable gaming machine software files corresponding to a default configuration of the first gaming machine, wherein the second tier comprises (i) a first members folder including a plurality of identification codes that uniquely identify a first group of multiple gaming machines including the first gaming machine, and (ii) a first files folder including executable gaming machine software files corresponding to a group-level configuration for the first group of gaming machines including the first gaming machine, wherein the third tier comprises executable gaming machine software files corresponding to a machine-level configuration of the first gaming machine;

first program logic executable to determine whether the machine signature matches the download signature;

second program logic, executable if the machine signature matches the download signature, to cause the first gaming machine to transition from operating in a state that does not allow the first gaming machine to carry out gaming to a state that allows the first gaming machine to carry out gaming;

third program logic, executable if the machine signature does not match the download signature, to cause the download server to transmit a software package for updating the first gaming machine, wherein the software package for updating the first gaming machine comprises at least one executable gaming machine software file contained within the hierarchical structure of electronic gaming machine software files, and fourth program logic, executable by the first gaming machine in response to receiving the software package, to update the first gaming machine with the software package, and to thereafter, transition from operating in the state that does not allow the first gaming machine to carry out gaming to the state that allows the first gaming machine to carry out gaming, wherein the group-level configuration is higher in priority than the default configuration, and wherein the machine-level configuration is higher priority than both the default configuration and the group-level configuration.

22. The system of claim 21, wherein the first program logic is (i) stored in data storage for the gaming machine, and (ii) executable by the gaming machine.

23. The system of claim 21, wherein the first program logic is (i) stored in data storage for the download server, and (ii) executable by the download server.

24. The system of claim 21, wherein the download server further includes the hierarchical file structure.

25. The system of claim 21, wherein the gaming machine includes a random-number generator for generating game results.

26. The system of claim 21, wherein the gaming machine interfaces to a gaming server that generates game results and provides the game results to the gaming machine.

27. The download server of claim 1, wherein the second tier includes a group file directory for storing the second tier of executable gaming machine software files, and wherein each executable gaming machine software file of the second tier is a replacement file for an executable gaming machine software file of the first tier.

28. The download server of claim 1, wherein at least one of the machine software files is for establishing a time-dependent wager amount for a game playable with the given gaming machine.

29. The download server of claim 28, wherein establishing the time-dependent wager amount includes: (i) establishing for the game a first minimum wager amount for use from a first time of day till a second time of day, and (ii) establishing for the game a second minimum wager amount for use from a third time of day till a fourth time of day, and wherein the first minimum wager amount is less than the second minimum wager amount.

30. The download server of claim 2, wherein the second tier includes a group file directory for storing the executable gaming machine software files of the second tier, and wherein each executable gaming machine software file of the second tier is a replacement file for an executable gaming machine software file of the first tier.

31. The download server of claim 30, wherein the third tier includes a machine file directory for storing the executable gaming machine software files of the third tier, and wherein each executable gaming machine software file of the third tier is a replacement file for an executable gaming machine software file of the first tier or the second tier.

32. The download server of claim 3 further comprising:

a user interface for displaying a graphical user interface (GUI), wherein the GUI is operable to visually present a respective identification code for each gaming machine of the group of gaming machines including the given gaming machine, and wherein the GUI is operable to visually present a folder including a list of the executable gaming machine software files of the second tier of executable gaming machine software files.

33. The method of claim 17, wherein the download server contains both the hierarchical structure of executable gaming machine software files and the executable gaming machine software files of the hierarchical structure.

34. The method of claim 17, wherein the first tier of executable gaming machine software files corresponding to a default configuration of the gaming machine comprises a gaming machine software file executable to cause the gaming machine to display an attraction video sequence when the gaming machine is idle.

* * * * *